May 13, 1958  M. C. WHEELER  2,834,369
STOP AND WASTE VALVE COMBINED WITH INSTALLATION SLEEVE
Filed June 26, 1956
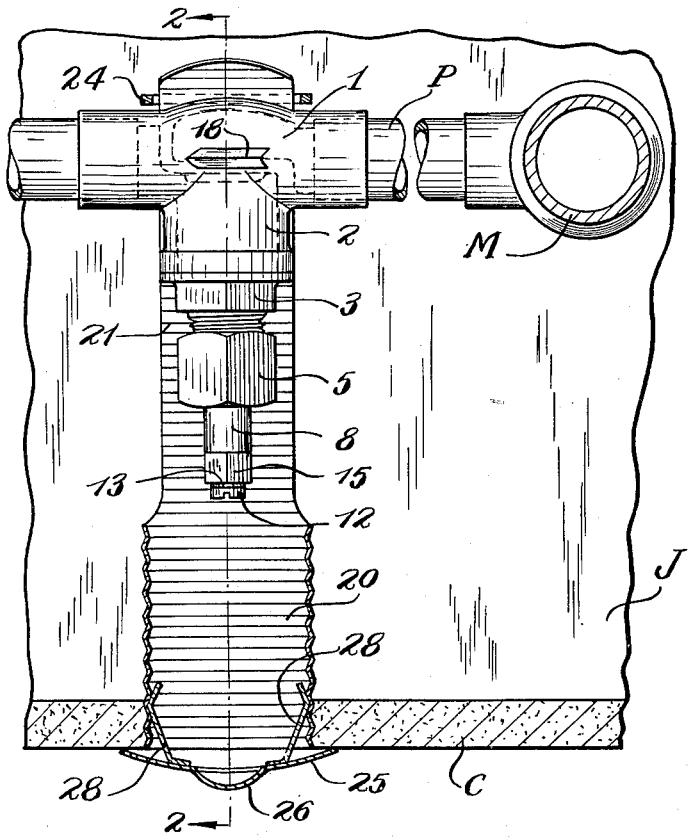
FIG. 1
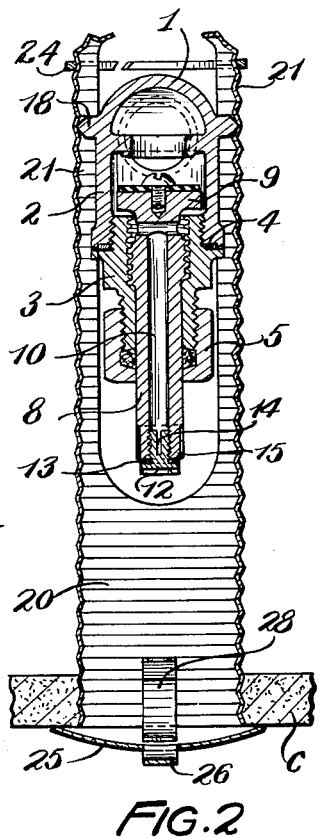
FIG. 2
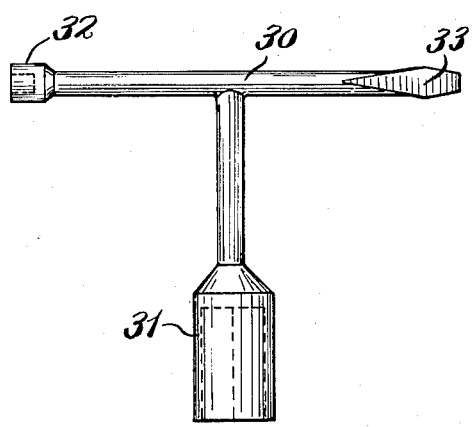
FIG. 4
FIG. 3
INVENTOR.
MYRON C. WHEELER
BY
Brennan B. West
ATTORNEY

United States Patent Office 2,834,369
Patented May 13, 1958

2,834,369

STOP AND WASTE VALVE COMBINED WITH INSTALLATION SLEEVE

Myron C. Wheeler, Shaker Heights, Ohio

Application June 26, 1956, Serial No. 593,871

12 Claims. (Cl. 137—360)

This invention relates to stop and waste valves, and more particularly to an improved valve of this class equipped with an installation sleeve.

The prevailing practice of plastering basement ceilings has heretofore made it necessary to remove the stop and waste valves from between overhead joists and to arrange them in groups at a suitable location in the basement, with one valve in each of the several pipes that lead from two manifolds that are communicatively connected, respectively, to the hot and cold water mains of the house system. This practice is expensive in labor and materials and sometimes offers difficult plumbing problems.

It is the fundamental object of my invention to provide an improved stop and waste valve combined with an installation sleeve that will permit such valves to be located in concealed areas and at the most convenient and logical places in the water system, and that will afford ready access to any selected valve for completely servicing it and for shutting off the water supply to the corresponding pipe and for draining such pipe if desired.

Another object of the invention is to provide a simple adjustment between the installation sleeve and valve body whereby the entrance end of the sleeve may be disposed substantially flush with the outer surface of the plaster, notwithstanding variations in the spacing of the valve from the plane of such surface.

Another object is to provide closure means for the entrance end of the installation sleeve that is convenient of attachment and removal, and that bears a number or other identifying mark so that all stop and waste valves in a system may be listed on a chart in association with designations of the respective pipes they control.

A further object of my invention is to incorporate in a globe valve that is otherwise of conventional design and construction, simple and inexpensive changes that adapt the valve to my purpose. By virtue of these changes the valve may be completely serviced through the installation sleeve, as well as manipulated to turn on and off the water supply to the downstream section of the pipe, and to drain said section.

The foregoing objects and advantages, with others that will appear as this description proceeds, are attained in the embodiment of the invention illustrated in the accompanying drawing. I wish it to be understood, however, that the present disclosure is to be taken as illustrative rather than as limiting, the invention being susceptible to such changes and modifications as come within the scope of the claims appended hereto.

In the drawing, wherein like parts are designated by like reference characters throughout the several views, Fig. 1 is a fragmentary view of a water system installation including my improved stop and waste valve and showing the installation sleeve attached thereto;

Fig. 2 is a section on the line 2—2 of Fig. 1;

Fig. 3 is an elevational view of the closure means or cap for the installation sleeve, and Fig. 4 is an elevational view, on a reduced scale, of a special tool for operating and servicing the valve.

In Fig. 1, M denotes a hot or cold water main of a house system. The main extends through holes in the joists of a floor, and to the bottom of the joists is applied a plastered ceiling C. The joist appearing in Fig. 1 is designated J. Connected to and leading from the main M is a pipe P for conveying water to some particular place, such as kitchen, bathroom, or sill cock.

In the pipe P is shown my improved stop and waste valve designated 1. This valve, in most respects, is of conventional design and construction. The body of the valve includes a branch or neck 2 into which is screwed the inner end of the bonnet 3 between the flange of which, and the end of the branch or neck 2, is interposed the usual fiber washer 4. Screwed onto the threaded outer end of the bonnet is the packing gland nut 5. 8 denotes the valve stem which incorporates, at its inner end, the usual valve member 9. Adjacent said member, the stem is provided with a threaded portion for cooperation with internal threads of the bonnet for causing the valve member to be moved toward and from the valve seat when the stem is rotated.

To adapt the valve to my purpose, the stem 8 is provided with a port 10 that communicates at its inner end with the downstream compartment of the valve body and that opens at its outer end to the atmosphere adjacent the outer end of the stem. In the present instance, said port is composed of a longitudinal bore that opens through the outer end of the stem and that communicates at its inner end, through a cross bore, with the downstream compartment of the valve body. A drain valve controls the port and the same, designated 12, desirably consists of a screw that operates within the internally threaded outer end of the port, a fiber washer 13 being interposed between the head of the screw and the end of the stem. The screw, at its inner end, has a transverse slot 14, or, in lieu thereof, the screw may be longitudinally grooved a suitable distance outwardly from its inner end, or otherwise treated, so that when the screw is retracted to uncover such slot, groove, or the like, the downstream section of the pipe P will be drained through the port 10. The outer end of the stem 8 is provided with a tool receiving part 15, presently shown as a squared portion of the stem, so that by application of a socket wrench to said part, the stem may be rotated. To permit of the application of such a wrench to the tool receiving part 15, it is essential that the head of the screw 12 and the washer 13 be of a diameter within the lesser transverse dimension of the tool receiving part.

Projecting from the opposite sides of the valve body are ribs 18, for a purpose presently to be explained. These ribs are desirably given the semblance of arrows in order to indicate the direction of flow through the valve body. 20 denotes an installation sleeve that consists of a length of circumferentially corrugated tubing of resilient material that is bifurcated, to a suitable depth from its inner end, to provide laterally yielding branches 21, the extremities of said branches being formed inwardly, as shown in Fig. 2.

During building construction, after the pipes are installed and before the plastered ceiling C has been applied to the joists J, a suitable gauge, as a strip of wood or other material of ceiling thickness, is laid across adjacent joists, and the sleeve 20 is slipped up over the valve body a sufficient distance to dispose its lower or entrance end substantially flush with the under side of the gauge. The sleeve is temporarily held in properly adjusted position by engagement of appropriate corrugations of the opposed branches 21 with the ribs 18, and the sleeve is then secured to the valve body against accidental displacement by application of a tension ring 24 to the branches 21 above the valve body. After the ceiling C has been applied to the under sides of the joists, a closure means or cap 25 is attached to the entrance end of the installation sleeve 20. This cap presently consists of a dished disc of metal that has a rectangular portion struck outwardly from its central region to provide a lug 26; and resilient fingers 28 are welded or otherwise secured to the inner side of the disc and are formed for holding engagement with the inner surface of the sleeve.

A numeral or other identifying mark may be applied to the cap, as shown in Fig. 3. The identifying marks of the caps associated with the several valves of the system may be listed on a chart, in association with the designations of the respective pipes they control, and the chart displayed in a convenient place so that by reference thereto any selected valve may be readily located.

As a convenience, I propose the use of a special tool, such as that illustrated in reduced size in Fig. 4, for operating and servicing the valve. The tool, designated 30, is T-shaped; and one of its three branches terminates in a head 31 that contains a socket for the reception of, and for operative connection with, the gland nut 5 and, also, the wrench receiving portion of the bonnet 3. Said socket is of sufficient depth to accommodate the valve stem 8 when applied to said portion of the bonnet. Another branch of the tool terminates in a small head 32 having a socket for cooperation with the tool receiving part 15 of the valve stem. The remaining branch is shaped to provide a screw driver bit 33.

When it is desired to shut off the water supply to the downstream section of the pipe P, the bit 33 of the tool 30 is engaged with the lug 26 of the cap 25 and the cap is withdrawn by means of the tool from the entrance end of the installation sleeve 20. The branch of the tool carrying the head 32 is now inserted upwardly into the sleeve and engaged with the part 15 of the valve stem, whereupon the stem is rotated by means of the tool to close the valve. If it is desired to drain said section of the pipe, the bit 33 is applied to the head of the screw that constitutes the drain valve 12 and the screw is retracted sufficiently to open the port 10 of the valve stem. The manner in which the valve is reversely operated to open it is self apparent.

When it is desired to inspect the main valve and valve seat, or to repair the seat or replace the valve washer, the branch of the tool 30 equipped with the larger head 31 is inserted through the entrance end of the installation sleeve and engaged over the stem and gland nut and applied to the wrench receiving portion of the bonnet so that, by means of the tool, the bonnet may be unscrewed and removed along with the parts carried thereby. On the other hand, if only the gland nut is to be removed for replacement of the packing, the branch of the tool is inserted a lesser distance so as to have operative connection only with the gland nut.

Having thus described my invention, what I claim is:

1. In combination, a stop and waste valve of the globe type comprising a valve body enclosing a downstream compartment, the valve including also a stem having a port that opens at its inner end into said compartment and at its opposite end exteriorly of the valve body adjacent the outer end of the stem, a drain valve controlling said port, and an installation sleeve consisting of a circumferentially corrugated tube, said tube being bifurcated to a suitable depth from one end so that said end of the tube may be engaged with opposite sides of the valve body, the tube enclosing the valve stem so that said stem is accessible through the opposite end of the tube, the valve body having on opposite sides thereof ribs for engagement with corrugations of the tube, and means applied to the bifurcated end of the tube for holding the opposed portions of the tube firmly engaged with the ribs.

2. The combination and arrangement of parts defined by claim 1 and, in addition thereto, closure means removably attached to said opposite end of the sleeve.

3. In combination, a stop and waste valve of the globe type comprising a valve body enclosing a downstream compartment, the valve including a stem having a longitudinal bore that opens through the outer end of the stem, and a transverse bore communicating therewith and opening into said compartment of the valve body, the outer end of the longitudinal bore being threaded, and a drain valve constituted of a screw that operates within the threaded end of the bore, said screw being provided with a passage that opens through its inner end into the longitudinal bore and stops at its opposite end short of the outer end of the threaded portion of the screw, the stem terminating at its outer end in a tool receiving part, and said screw having a tool receiving part whose maximum transverse dimension is within the minimum transverse dimension of the tool engaging part of the stem, said stop and waste valve having the conventional bonnet and gland nut that surround the stem, and an installation sleeve of resilient material and of fixed length surrounding and spaced radially from the bonnet and gland nut and through the entrance end of which, remote from the valve, said bonnet, gland nut, stem and drain valve are accessible, said sleeve being bifurcated a substantial distance from its end adjacent the valve to provide branches that are disposed on opposite sides of the valve, the valve having on at least one side a laterally facing holding part, and the contiguous branch of the sleeve being provided with a series of holding parts spaced apart longitudinally of the sleeve and any selected one of which is adapted to be placed in cooperation with the holding part of the valve.

4. The combination and arrangement of parts defined by claim 3, and, in addition thereto, closure means for the entrance end of the sleeve.

5. The combination and arrangement of parts defined by claim 3, and, in addition thereto, a tension device applied to and embracing the opposed branches of the sleeve thereby to prevent disengagement of said holding parts that are in cooperation.

6. In combination, a stop and waste valve of the globe type comprising a valve body enclosing a downstream compartment, the valve including a stem having a longitudinal bore that opens through the outer end of the stem, and a transverse bore communicating therewith and opening into said compartment of the valve body, the outer end of the longitudinal bore being threaded, and a drain valve constituted of a screw that operates within the threaded end of the bore, said screw being provided with a passage that opens through its inner end into the longitudinal bore and stops at its opposite end short of the outer end of the threaded portion of the screw, the stem terminating at its outer end in a tool receiving part, and said screw having a tool receiving part whose maximum transverse dimension is within the minimum transverse dimension of the tool engaging part of the stem, said stop and waste valve having the conventional bonnet and gland nut that surround the stem, the valve body having ribs projecting from the opposite sides thereof, and an installation sleeve consisting of a circumferentially corrugated tube of resilient material bifurcated from one end to within a suitable distance of its opposite end, the sleeve enclosing and being radially spaced from the bonnet, gland nut, stem and drain valve and having the opposite sides of its bifurcated end disposed on opposite sides of the valve body so that said ribs may be received by opposed corrugations of the sleeve.

7. The combination and arrangement of parts defined by claim 6, and, in addition thereto, means applied to the bifurcated end of the sleeve for holding the opposed parts of the sleeve in firm engagement with said ribs.

8. The combination and arrangement of parts defined by claim 6, and, in addition thereto, closure means for the entrance end of the sleeve.

9. In combination, a valve that is adapted to be installed in a pipe concealed in a wall in inwardly spaced relation to the outer wall surface, said valve having a laterally facing holding part, and an installation sleeve of fixed length enclosing the valve and adapted to have its entrance end exposed through and located substantially in the plane of said wall surface, the valve including an operating member accessible through said sleeve, the sleeve including a resilient portion provided with a series of holding parts for frictional engagement with the holding part of the valve and that are spaced apart longitudinally of the sleeve.

10. The combination and arrangement of parts defined by claim 9, and, in addition thereto, means for binding said resilient portion of the sleeve to the valve to prevent dislodgment of a selected holding part of the sleeve from the holding part of the valve.

11. In combination, a valve including an operating member and provided on opposite sides with lateral projections, and a circumferentially corrugated installation sleeve of fixed length surrounding the valve and through the entrance end of which said operating member is accessible for actuation, the sleeve being of relatively stiff resilient material and bifurcated a substantial distance from its end adjacent the valve to provide yielding branches adapted to be disposed on opposite sides of the valve, whereby selected corrugations of the branches may be engaged with the lateral projections of the valve.

12. The combination and arrangement of parts defined by claim 11, and, in addition thereto, a tension device applied to and embracing said branches for positively holding them in contact with the lateral projections of the valve.

References Cited in the file of this patent

UNITED STATES PATENTS

| | | |
|---|---|---|
| 58,845 | Lehman | Oct. 16, 1866 |
| 407,955 | Kallaher | July 30, 1889 |
| 613,652 | Chadbourne | Nov. 1, 1898 |
| 616,542 | Koehne | Dec. 27, 1898 |
| 1,139,279 | Hart | May 11, 1915 |
| 2,046,330 | Leoffert | July 7, 1936 |

FOREIGN PATENTS

| | | |
|---|---|---|
| 3,119 | Germany | of 1878 |